United States Patent [19]
Hein

[11] Patent Number: 5,986,830
[45] Date of Patent: Nov. 16, 1999

[54] READ/WRITE CHANNEL WRITE PRECOMPENSATION SYSTEM AND METHOD USING ONE OR MORE DELAY CLOCKS

[75] Inventor: Jerrell P. Hein, Driftwood, Tex.

[73] Assignee: Cirrus Logic, Inc., Fremont, Calif.

[21] Appl. No.: 08/902,832

[22] Filed: Jul. 30, 1997

[51] Int. Cl.[6] .................................................. G11B 5/09
[52] U.S. Cl. .............................................. 360/45; 360/51
[58] Field of Search .......................... 395/555; 370/536; 360/51, 45; 369/59; 375/285, 296, 348

[56] References Cited

U.S. PATENT DOCUMENTS

| | | | |
|---|---|---|---|
| 4,063,308 | 12/1977 | Collins et al. | 395/555 |
| 4,408,349 | 10/1983 | Yukawa . | |
| 4,864,437 | 9/1989 | Couse et al. . | |
| 4,979,055 | 12/1990 | Squires et al. . | |
| 5,170,299 | 12/1992 | Moon . | |
| 5,255,136 | 10/1993 | Machado et al. . | |
| 5,297,184 | 3/1994 | Behrens et al. . | |
| 5,321,559 | 6/1994 | Nguyen et al. . | |
| 5,335,365 | 8/1994 | Ballantyne et al. . | |
| 5,345,342 | 9/1994 | Abbott et al. . | |
| 5,384,671 | 1/1995 | Fisher . | |
| 5,422,760 | 6/1995 | Abbott et al. . | |
| 5,424,881 | 6/1995 | Behrens et al. . | |
| 5,459,679 | 10/1995 | Ziperovich . | |
| 5,572,558 | 11/1996 | Beherns . | |
| 5,576,904 | 11/1996 | Behrens | 360/51 |
| 5,638,230 | 6/1997 | Kadlec | 360/78.04 |
| 5,642,243 | 6/1997 | Bliss | 360/51 |
| 5,726,990 | 3/1998 | Shimada et al. | 370/536 |

OTHER PUBLICATIONS

Cideciyan et al., "A PRML System for Digital Magnetic Recording," *IEEE J. on Sel. Com.*, Jan. 10, 1992.

Coker et al., "Implementation of PRML in a Rigid Drive," *IBM Storage Systems Products Division*, Manuscript received Jul. 7, 1991.

Fields et al., "SA 19.1: A 200 Mb/s CMOS EPRML Channel with Integrated Servo Demodulator for Magnetic Hard Disks," *IEEE Int'l Solid–State Circuits Conf*, Feb. 8, 1997.

Goodenough, "DSP Technique Nearly Doubles Disk Capacity," *Electronic Design*, 53–57, Feb. 4, 1993.

Reed et al., "Performance of A d=0 Demod/Remod Detector With Partial Erasure Matching," *Cirrus Logic*, Manuscript received Feb. 4, 1997.

Spalding et al., "SA 19.5: A 200Msample/s 6b Flash ADC in 0.6 μm CMOS," *IEEE International Solid–State Circuits Conference*, Feb. 10, 1996.

Spurbeck et al., "Interpolated Timing Recovery for Hard Disk Drive Read Channels," *IEEE*, Aug. 1997.

Tuttle et al., "TP 4.2: A 130Mb/s PRML Read/Write Channel with Digital–Servo Detection," IEEE International Solid–State Circuits Conference, Feb. 8, 1996.

Vanderkooy et al., "Resolution Below the Least Significant Bit in Digital Systems with Dither," *J. Audio Eng. Soc.*, 32(3), Mar. 1984.

Welland et al., "FA 17.1: A Digital Read/Write Channel with EEPR4 Detection," *International Solid–State Circuits Conference*, Feb. 18, 1994.

Welland et al., "Implementation of a Digital Read/Write Channel with EEPR4 Detection," *IEEE Transactions, Magnetics*; 31(2), Mar. 1995.

Welland et al., "Implementation of a Digital Read/Write Channel with EEPR4 Detection,"—Outline; Crystal Semiconductor Corporation and Cirrus Logic; TMRC '94 Session:F2.

Yamasaki et al., SA 19.2: A 1,7 Code EEPR4 Read Channel IC with an Analog Noise Whitened Detector, *IEEE International Solid–State Circuits Conference*, Feb. 8, 1997.

*Primary Examiner*—W. Chris Kim
*Attorney, Agent, or Firm*—Richard D. Egan; Dan A. Shifrin

[57] ABSTRACT

An improved write precompensation circuit for a read/write channel circuit and system is provided. Multiple data input signals are provided, each being clocked by a different clock. The data input signals are then multiplexed. Two, three or more data clock delays may be utilized to provide two, three or more data delays to achieve the write precompensation. Only one edge of a signal need pass through a multiplexer before the multiplexer may change state. The amount of delay may be user programmable.

20 Claims, 8 Drawing Sheets

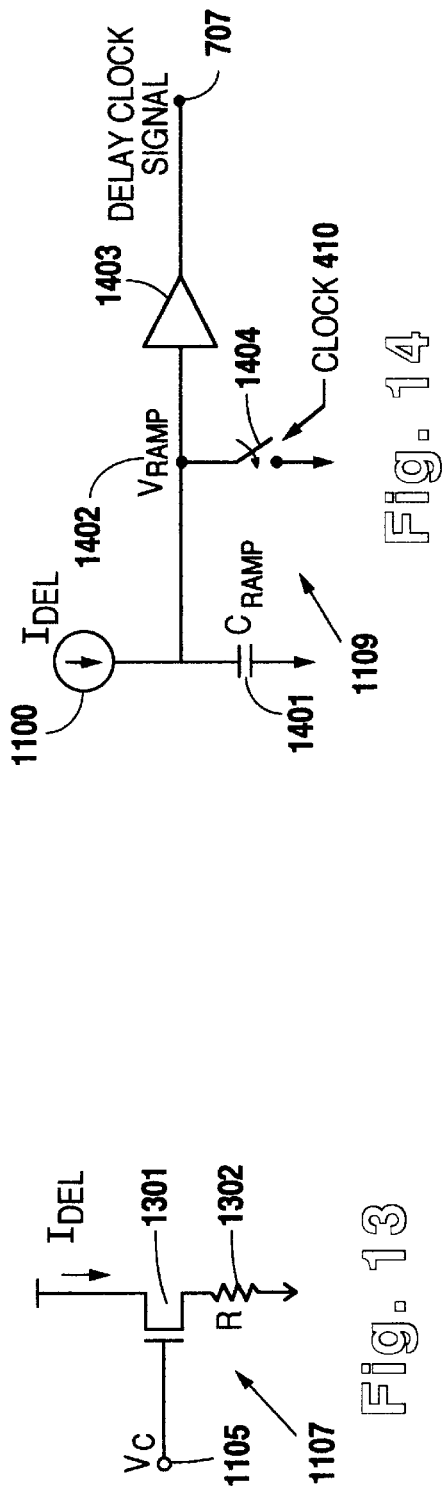
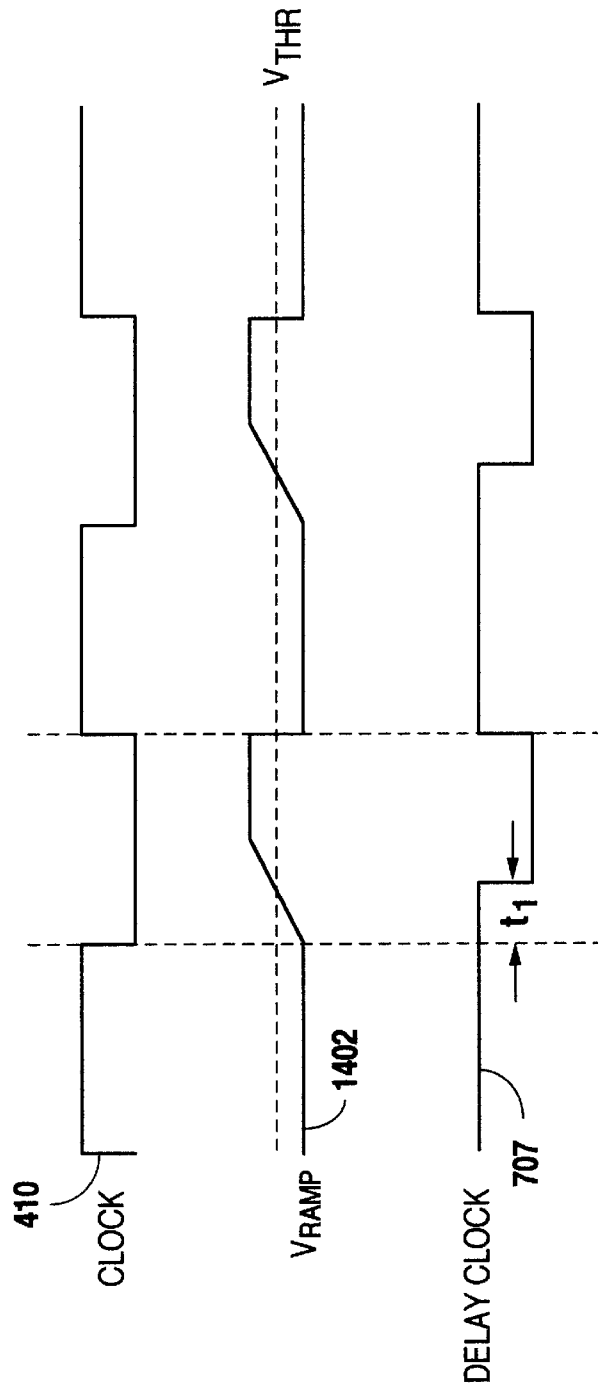
Fig. 14
Fig. 13
Fig. 15

READ/WRITE CHANNEL WRITE PRECOMPENSATION SYSTEM AND METHOD USING ONE OR MORE DELAY CLOCKS

BACKGROUND OF THE INVENTION

1. Field of Invention

This invention relates to read/write channel circuits for magnetic disk drive systems, and more particularly to write precompensation circuits utilized when writing data to the magnetic disk drive.

2. Description of Related Art

In magnetic disk storage systems for computers, such as hard disk drives, digital data serves to modulate the current in a read/write head coil so that a sequence of corresponding magnetic flux transitions are written in bit cells of a magnetic medium in concentric tracks. To write data to the disk, digital data is presented to a read/write amplifier which in turn provides positive or negative current to a head coil. Digital "1"s in the data stream cause transitions in the write current from one polarity to the other. Thus, data is written to the disk as abrupt transitions in the write signal polarity. To read this recorded data, the read/write head passes over the magnetic medium and transduces the recorded magnetic transitions into pulses and an analog signal that alternates in polarity. These pulses are then decoded by read/write channel circuitry to reproduce the digital data.

When writing the abrupt transitions to the disk, non-linear effects in the writing process may occur. For example, if two consecutive polarity transitions (a "11" pattern) are to be written to the disk, significant non-linear bit shift in the second transition and non-linear amplitude degradation in both transitions may occur. One method for compensating for the non-linear bit shift effects is to shift the location of the transition away from the nominal bit cell boundaries. This compensation technique is called write precompensation (WPC). The WPC circuitry delays the writing of certain "1"s to counter the non-linear bit shift effects. For example, when a "11" pattern is to be written, the WPC circuitry delays the writing of the second "1". In some cases it may be necessary to shift the transitions a significant fraction of the bit cell; therefore, a circuit which allows for a wide WPC range is desirable.

One prior art circuit for accomplishing write precompensation is shown in FIG. 1. As shown in FIG. 1, a write precompensation circuit 1 receives data to be written on a disk on a data input (line 10) and outputs data on the data output (line 30). The data is timed through a D Flip-Flop 20 which latches the data according to a timing signal 40. When desired, the timing signal 40 provides an appropriate timing delay to accomplish the necessary write precompensation. The timing signal 40 is generated by use of a zero delay clock 50 (C0 clock signal) and a delayed clock 60 (C1 clock signal). The C0 and C1 clock signals are provided to a clock multiplexer 70 which selects one of the clocks for timing the data signal in response to the select signal 80.

The clock signals C0 and C1 may be narrow pulse signals to allow the entire pulse to pass through the clock multiplexer 70 and to allow some delay in C0 vs. C1 without violating the setup and hold times of the multiplexer. A sample timing diagram for the write precompensation circuit 1 is shown in FIG. 1A. As shown in FIG. 1A, the pulse width of the clock signals is PW and the write precompensation (the delay between C0 and C1) is WPC. For an ideal multiplexer with zero setup and hold times, the maximum amount of WPC is: $WPC_{max}=T-PW$. At high frequencies, PW is limited by the rise and fall times of the clocks since the entire pulse passes through the multiplexer before the state of the multiplexer may change. Because the rise and fall times may consume a significant percentage of select signal time T, the maximum amount of WPC may be undesirably limited. Thus, it would be desirable to utilize a write precompensation circuit that provides an improved WPC range.

SUMMARY OF THE INVENTION

An improved write precompensation circuit is provided. Multiple data input signals are provided, each being clocked by a different clock, thus providing multiple data signals with varying delays. The data input signals are then multiplexed. Two, three or more clock signals may be utilized to clock the data to provide two, three or more delays. Only one edge of a signal need pass through a multiplexer before the multiplexer may change states.

In one embodiment, a write precompensation circuit is provided. The write precompensation circuit may comprise a data input terminal; a plurality of clock signals, at least one of the clock signals being delayed with respect to at least another of the clock signals, the clock signals being utilized to clock data at the data input terminal to generate a plurality of clocked data signals, at least one of the clocked data signals being delayed with respect to at least another of the clocked data input signals; a multiplexer coupled to the clocked data signals; and a data output terminal coupled to the multiplexer, the multiplexer providing at least one of the clocked data signals to the data output terminal.

A method of processing data in a write precompensation circuit is also disclosed. The method may comprise providing an input data stream; clocking the data stream by a plurality of precompensation clock signals to generate a plurality of clocked precompensation data streams, at least one of the clocked precompensation data streams being delayed with respect to at least another of said clocked precompensation data streams; and selecting at least one of the precompensation data streams to provide output data.

The another embodiment of the invention, a system for storing data is provided. The system may comprise a data storage device; a system data input terminal for receiving data to be written to the data storage device; and a write channel circuit coupled to the system data input terminal and the data storage device. The write channel circuit may include a data compensation circuit that comprises a plurality of clock signals, at least one of the clock signals being delayed with respect to at least another of said clock signals, the clock signals being utilized to clock said data to generate a plurality of clocked data signals, at least one of the clocked data signals being delayed with respect to at least another of the clocked data input signals, and a multiplexer coupled to the clocked data signals, the multiplexer providing at least one of the clocked data signals at an output of the multiplexer.

In yet another embodiment of the present invention, a method of operating a system for writing data to a data storage device is provided. The method may comprise providing a data storage device; providing data to be written to the data storage device; and processing the data to provide write precompensation. The processing step may comprise clocking the data by a plurality of precompensation clock signals to generate a plurality of clocked precompensation data streams, at least one of the clocked precompensation data streams being delayed with respect to at least another of the clocked precompensation data streams, and selecting at least one of the precompensation data streams to provide output data.

DESCRIPTION OF DRAWINGS

FIG. 13 is a circuit diagram of a transconductance cell for use with the delay circuit of FIG. 11.

FIG. 14 is a circuit diagram of variable delay for use with the delay circuit of FIG. 11.

FIG. 15 is a timing diagram for signals referenced in the circuit of FIG. 14.

DESCRIPTION OF PREFERRED EMBODIMENTS

Figure 1:
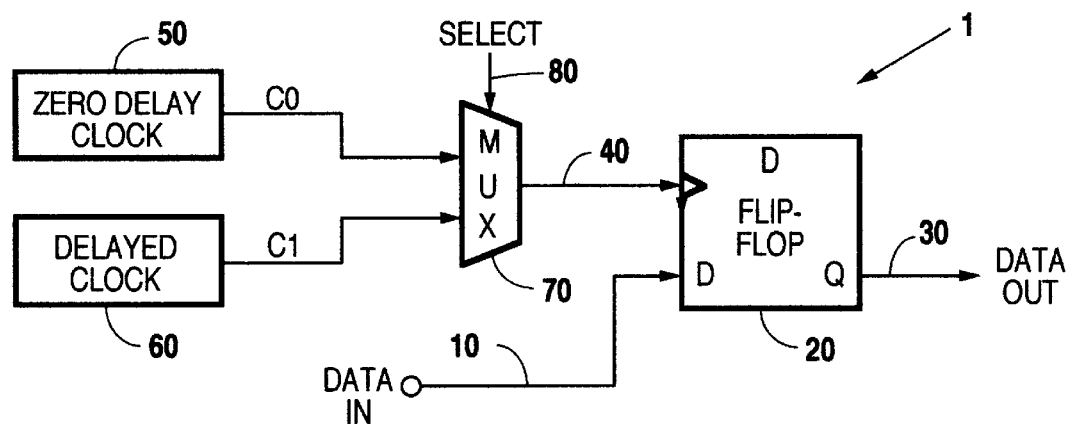
FIG. 1 illustrates a prior art circuit for implementing write precompensation.
Figure 1A:
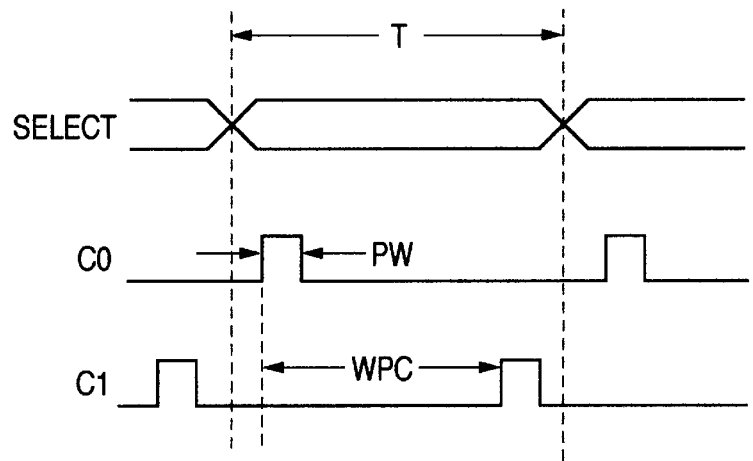
FIG. 1A is a timing diagram for the circuit of FIG. 1.
Figure 2:
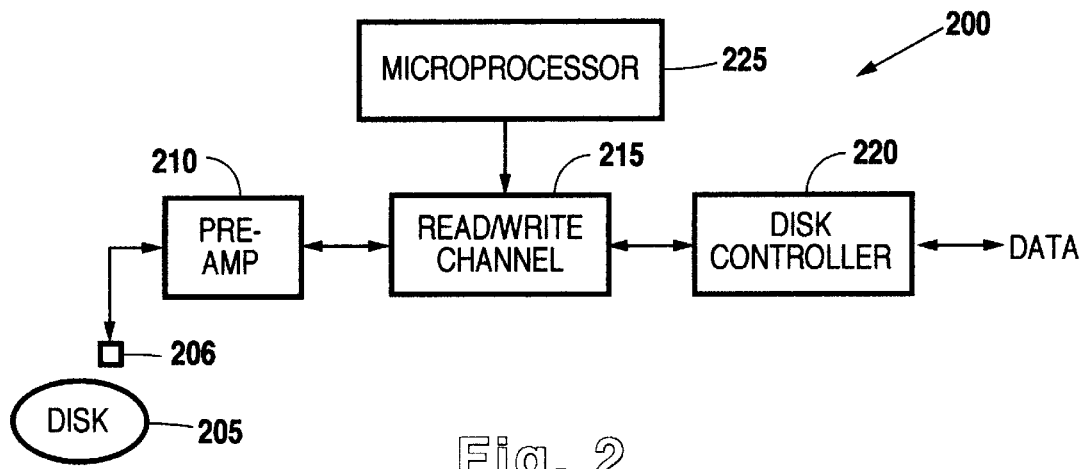
FIG. 2 is a block diagram of a disk drive system.

FIG. 2 illustrates a disk drive system 200 in which the present invention may be utilized. The disk drive system may include a disk 205, a read/write head 206, a pre-amp 210, a read/write channel circuit 215, a microprocessor 225, and a disk controller 220. The disk 205, the read/write head 206, the pre-amp 210, the microprocessor 225, and the disk controller 220 may be implemented individually or in combination through the use of any of a wide variety of commercially available components. For example, the microprocessor may be a general 8-bit microprocessor, the disk controller may be a user's own custom ASIC or a commercially available controller such as the SH7600 available from Cirrus Logic, and the disk 205 and read/write head 206 may be any of a number of hard disks and heads available from hard disk manufacturers.

Data is read and written to the disk 205 by the head 206 which receives and transmits the data through a data path which includes the disk controller 220, the read/write channel circuit 215 and the preamp 210. The disk drive system 200 shown in FIG. 2 is just one illustrative example of a disk drive system, other disk drive systems may also utilize the present invention. For example though shown separately, various components of the disk drive system may be combined. Further, additional components may be considered to be part of the disk drive system including components such as RAM, ROM, power supply circuits, and other circuits.

Figure 3:
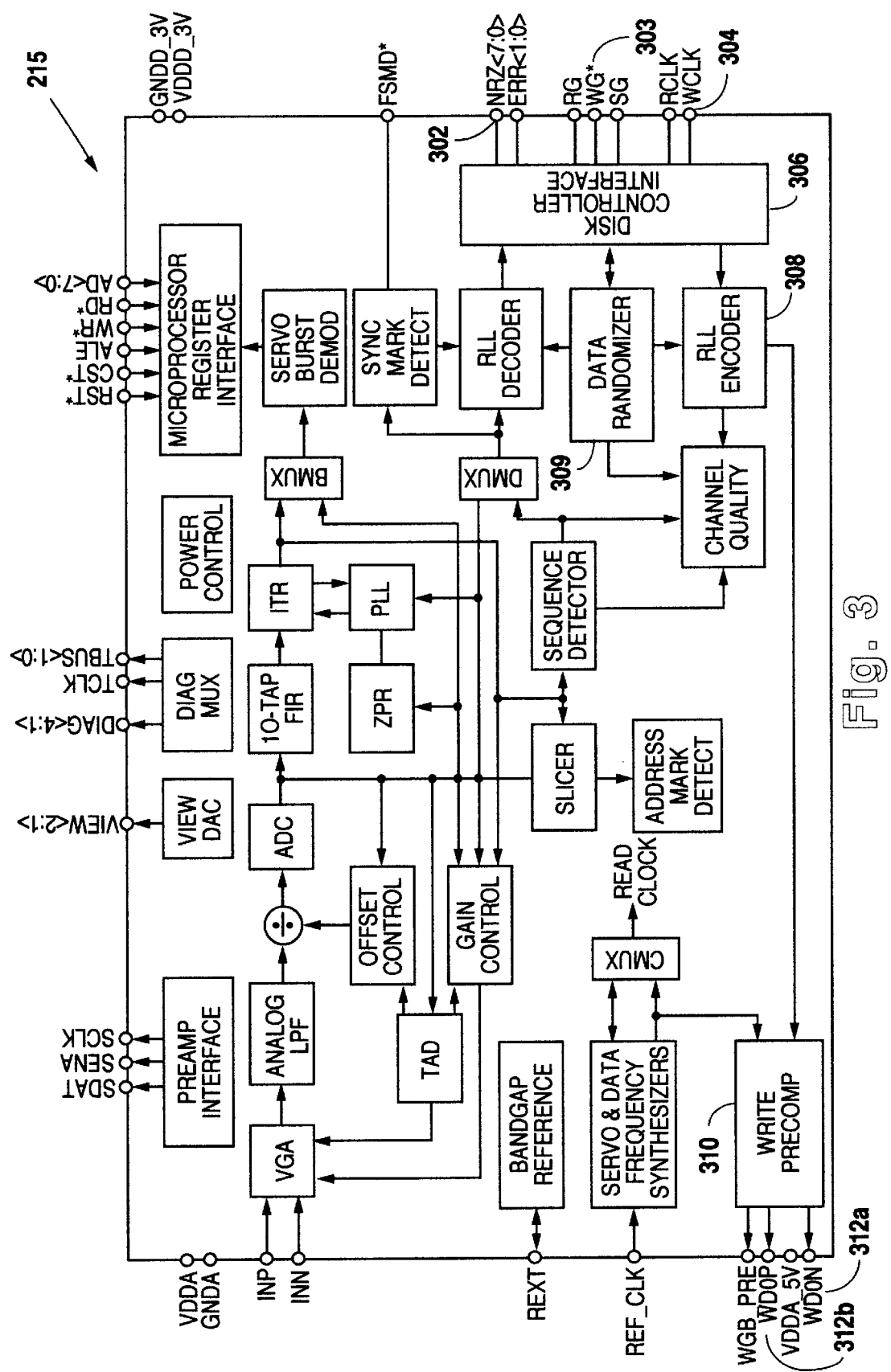
FIG. 3 is a block diagram of a read/write circuit.

FIG. 3 is a functional block diagram of the read/write channel circuit 215 of FIG. 2. Data may be presented from the disk controller to the read/write channel circuit 215 at data bus pins 302 (NRZ<7:0>). The write mode (i.e. data being presented from the disk controller to the read/write channel circuit for writing on the disk) may be indicated through the use of a write signal on the WG pin 305. The data may be clocked in to the NRZ pins 302 according to a write byte clock pin 304. During a write operation, the data may be provided from a disk controller interface 306 to a data randomizer 309 and an RLL (run length limited) encoder 308. The data randomizer 309 may operate to remove periodic patterns that may exist in the data. The RLL encoder 308 operates to encode the data according to the RLL standard. From the RLL encoder 308 the data is provided to the write precompensation circuit 310. The output of the write precompensation circuit may be provided to a preamp through negative and positive write data output pins 312a and 312b (WDON and WDOP pins respectively).

Though FIG. 3 illustrates an example read/write channel circuit 215 utilizing encoding, encoding need not be utilize with the present invention. Furthermore, though a read/write channel circuit 215 is shown in FIGS. 2 and 3, the present invention may be utilized in a circuit that does not include read circuitry (i.e. a write channel only circuit). Thus, as used herein a write channel circuit may indicate a write channel only circuit or a circuit that includes read and write functions (read/write channel circuit) or additional functions.

Figure 4:
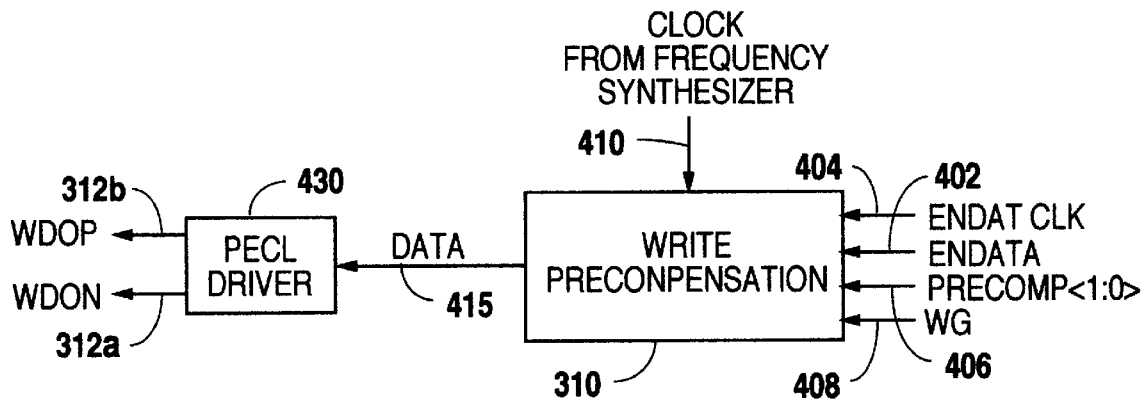
FIG. 4 is a block diagram of analog portions of the circuit of FIG. 3.

FIG. 4 provides additional details as to the inputs and outputs to the write precompensation circuit 310. As shown in FIG. 4, the inputs to the write precompensation circuit 310 may include a data input 402 (ENDATA), a data clock input 404 (ENDAT CLK), a write precompensation select input 406 (PRECOMP<1:0>), a write signal 406 (WG) and clock signal 410 from a frequency synthesizer. The write precompensation select input 406 provides a two bit input to select the use of write precompensation as discussed in more detail below. The data output 415 may be provided to a PECL driver 430. The PECL driver 430 provides the outputs WDON 312a and WDOP 312b as differential pseudo emitter-coupled logic outputs.

As shown in FIG. 4, a clock signal 410 is utilized in addition to the encoded data input clock (data clock input 404). The data clock input 404 provides a clock signal that is processed through the disk controller interface 306 and RLL encoder 308 and therefore may contain inaccuracies such as jitters, phase shift, etc. By providing an independent clock signal (clock signal 410) directly from a frequency synthesizer, an uncorrupted clock may be used for clocking the write precompensation circuit 310. The principles of the present invention disclosed herein, however, are not limited to the use of a clock signal supplied directly from a clock source.

The frequency synthesizer may generate a user variable clock frequency. For example, the frequency synthesizer may include a variable frequency oscillator utilized with a phase lock loop. In one embodiment, the frequency of the clock signal may range from approximately 40 to 225 Mhz. Numerous specific frequencies may be selected by a user by first selecting one of seven sub-ranges of the entire 40 to 255 Mhz range. Each sub-range may than be partitioned into thirty-two specific frequencies, thus providing the user a large number of data frequencies at which to operate the read/write channel circuit.

Figure 5:
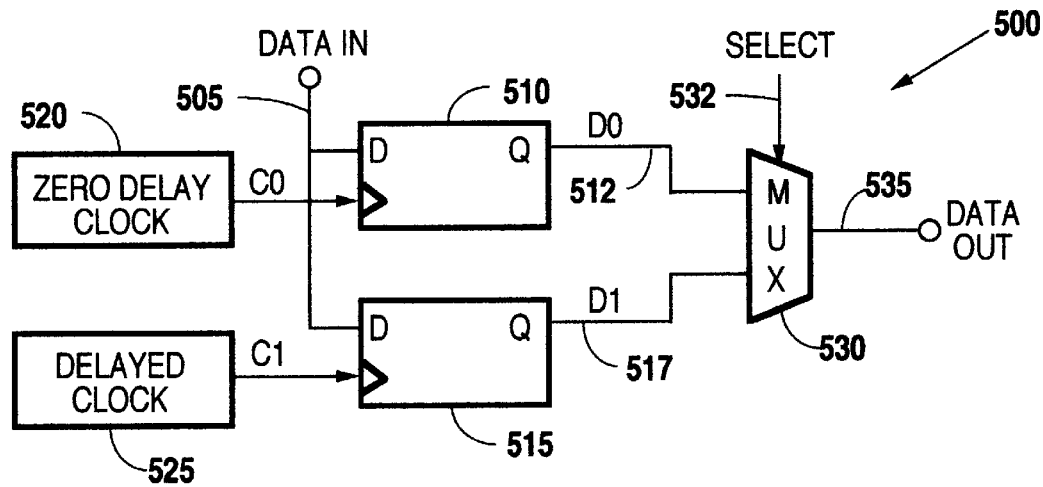
FIG. 5 is a write precompensation circuit according to the present invention.

FIG. 5 illustrates one embodiment of a write precompensation circuit 500 according to the present invention. As shown in FIG. 5, the data is provided to the circuit 500 on a data in signal line 505. The input data is latched by to two D Flip-Flops 510 and 515 (or alternatively any other suitable latch circuit). Each D Flip-Flop 510 and 515 is clocked by a separate clock signal. Thus, D Flip-Flop 510 is clocked by a zero delay clock 520 which produces clock signal C0 and D Flip-Flop 515 is clocked by a delay clock 525 which produces clock signal C1. The output 512 (D0) of D Flip-Flop 510 and the output 517 (D1) of D Flip-Flop 515 are provided to a multiplexer 530. The select signal 532 selects which of the Flip-Flop outputs is provided on the data output line 535. In operation, if a write precompensation delay is not desired then the input data is clocked by the zero delay clock 520 and the data on the D Flip-Flop output 512 (D0) is selected for the output 535. Further if a write precompensation delay is desired, the input data is clocked by the delayed clock 525 and the data on the D Flip-Flop 510 is selected for the output 535. Thus, the data itself may be multiplexed rather than multiplexing the narrow clock pulses as in the prior art. By multiplexing the data, only one edge of a signal is passed through the multiplexer before the multiplexer can change states.

Figure 6:
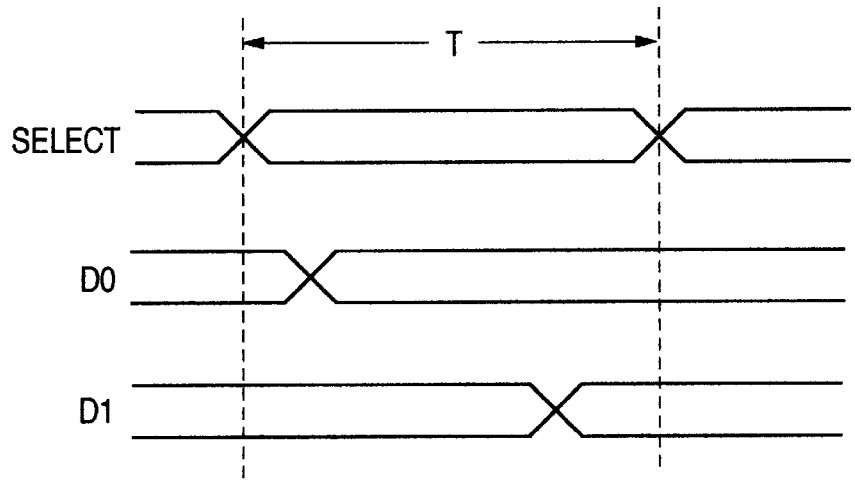
FIG. 6 is a timing diagram for the write precompensation circuit of FIG. 5.

FIG. 6 illustrates a timing diagram for the write precompensation circuit 500 of FIG. 5. For the ideal multiplexer (zero setup and hold times), the maximum precompensation delay is: $WPC_{max}=T-t_{r/f}$ where $t_{r/f}$ is one of the rise time or fall time of the data signal. Since $t_{r/f}$ is always less than the signal pulse width PW (which is at least the sum of the rise and fall times), the maximum precompensation delay is greater in the data multiplexing architecture verses the clock multiplexer architecture of the prior art. Moreover, because the clocks themselves are not multiplexed, the need for narrow pulse width clocks is lessened thus easing the design constraints for the clocks. Rather because the data is being multiplexed, only one edge of a signal need pass through a multiplexer before the multiplexer may change states.

Figure 7:
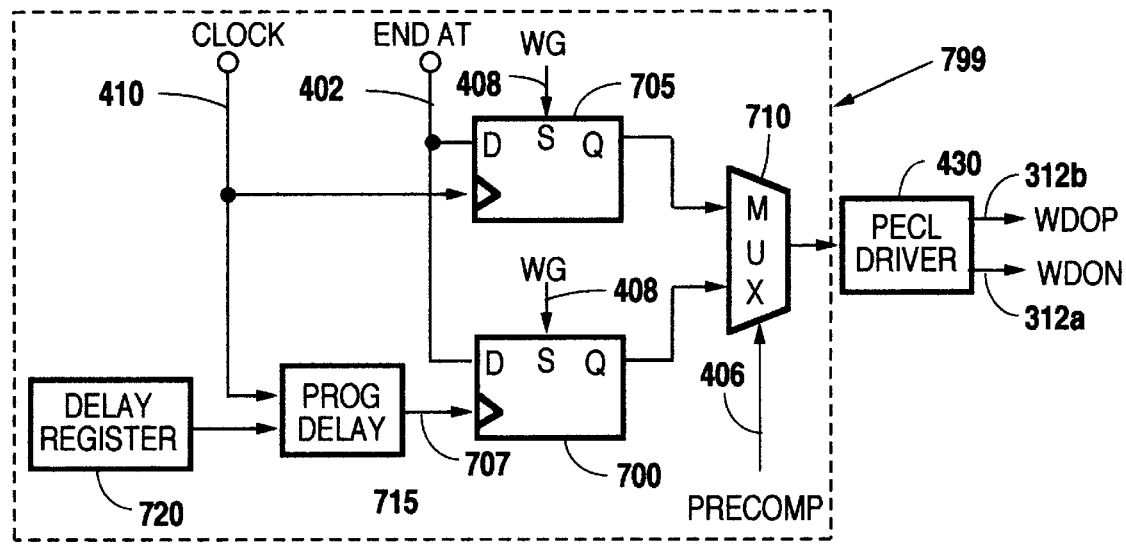
FIG. 7 is another write precompensation circuit according to the present invention.

The operation principles of the circuit of FIG. 5 may be incorporated into a write precompensation circuit for use with the system and circuits of FIGS. 2–4. For example, FIG. 7 illustrates a circuit 799 which may be utilized as the write precompensation circuit 310 of FIG. 4. As shown in FIG. 7, the input data is provided to the write precompensation circuit on data line 402 (ENDAT). Clock line 410 (for example a clock signal provided from a frequency synthesizer) provides a write clock. The input data on data line 402 is provided to the D input of two D Flip-Flops 700 and 705. Each Flip-Flop also receives the WG signal 408 at the S input. The Flip-Flop 700 is clocked by the undelayed write clock signal 410 while the Flip-Flop 705 is clocked at a delayed time to provide write precompensation. The Q outputs of the Flip-Flops 705 and 710 are then provided to a multiplexer 710 which provides to the PECL driver 430 data without a delay or the delayed data depending on the PRECOMP signal 406.

The delayed clock signal 707 which is provided to the Flip-Flop 705 is generated by a programmable delay circuit 715. Delay circuit 715 receives inputs from the undelayed write clock 410 and a delay register 720. The delay register 720 contains a user selectable value indicative of the desired amount of delay. Thus, the amount of write precompensation is programmable by the user. In this case, the write precompensation delay is the difference between the clocks on the clock line 410 and programmable delay clock signal 707. The delay register may also indicate when it is desirable to bypass the write precompensation. For example, setting the delay register 720 to all "0"s may power down the delay circuit 715.

Figure 8:
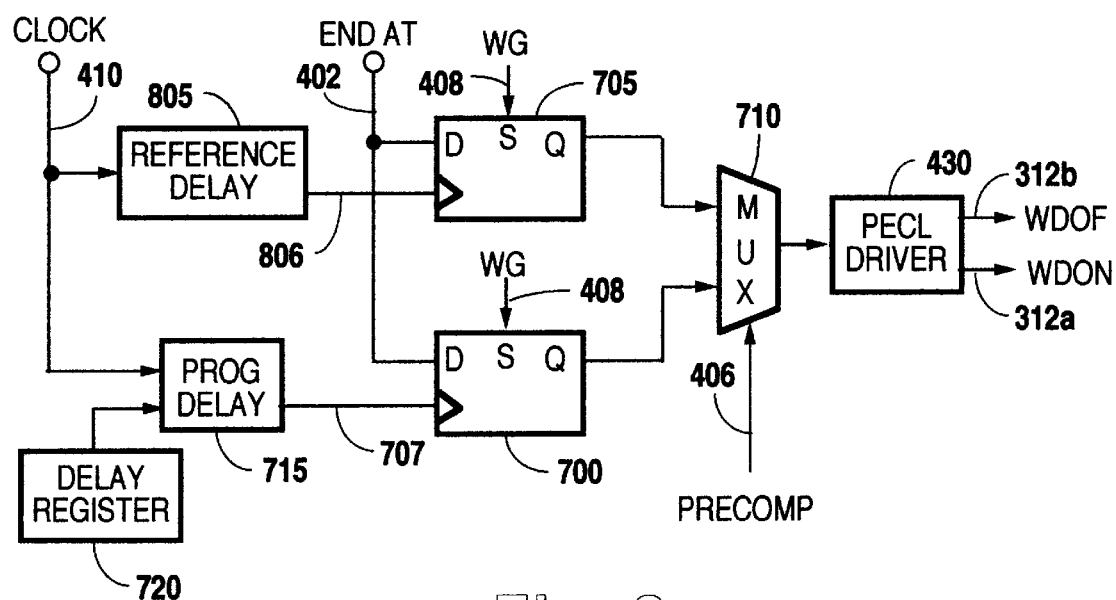
FIG. 8 is another write precompensation circuit according to the present invention.

FIG. 8 is a modification of the write precompensation embodiment described with reference to FIG. 7. In FIG. 8, a reference delay circuit 805 and is added to provide the clock signal for D Flip-Flop 705. In the embodiment of FIG. 8, the undelayed data may be clocked according to a known reference delay, such as reference delay 805 rather than directly from the clock signal 410. In this case, the write precompensation delay is the difference between the clocks on reference clock line 806 and programmable delay clock line 707. The delay circuits utilized for the reference delay 805 and the delay circuits 715 may be delay circuits which have a delay composed of two components, an offset delay and a programmable delay. The net delay of the delay circuit 715 is formed by the addition of the offset delay and the programmable delay. The amount of the programmable delay is set by the user by setting the desired binary values in the delay register 720. The reference delay circuit 805 is operated with the programmable portion of the delay set to zero by setting all delay bits to "0" (as opposed to the user selectable value in a delay register). Thus, the reference delay is the set offset value of the delay circuits. Further, the net precompensation delay between the reference clock line 806 and the programmable delay clock line 707 is determined by the programmable delay portion of the programmable delay circuit 715. Similar to the embodiment of FIG. 7, the write precompensation circuit of FIG. 8 can be bypassed by the appropriate settings in the delay register 720. For example, setting register 720 to all "0"s may result in no net delay difference between clock lines 806 and 707, thus providing no write precompensation.

Figure 9:
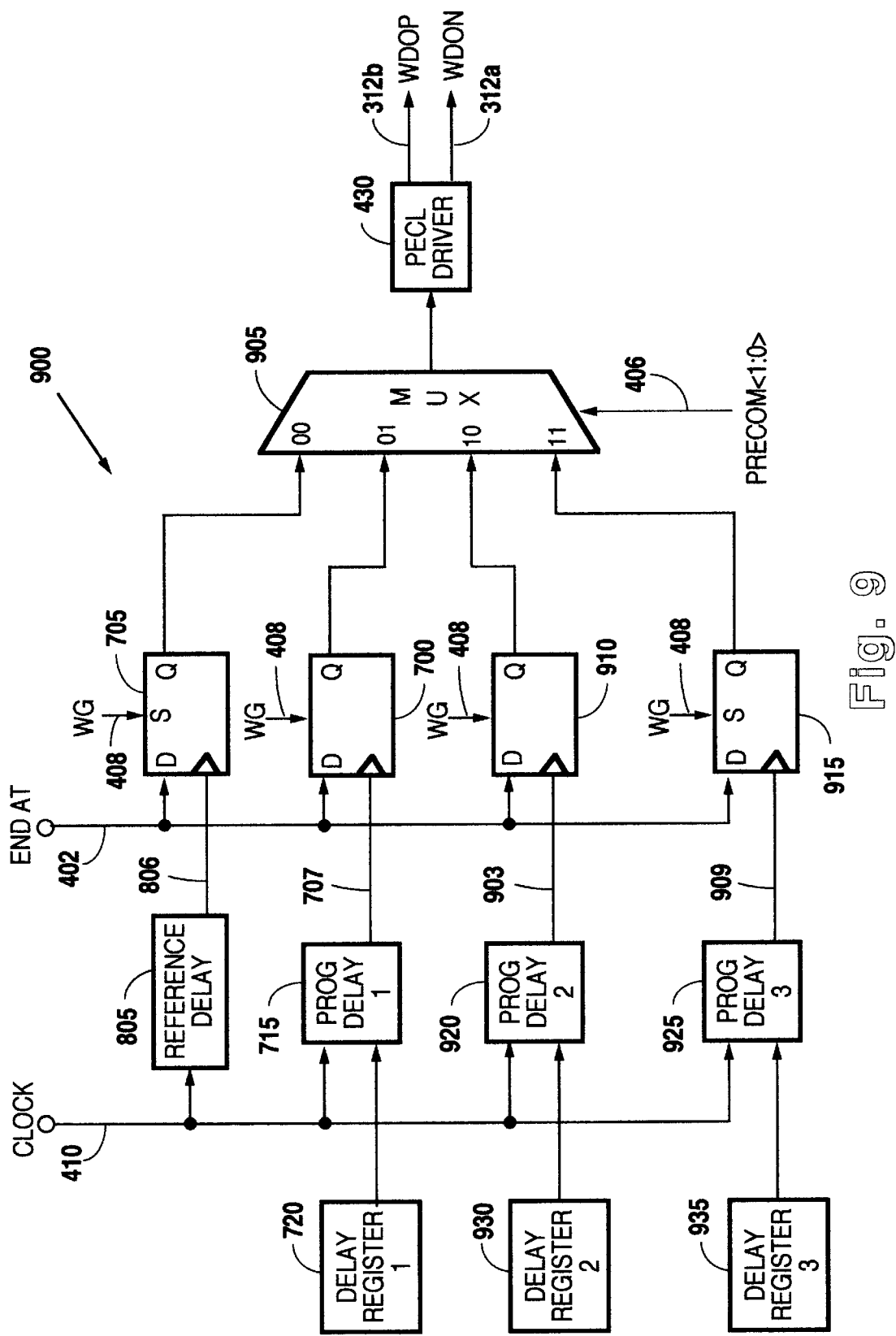
FIG. 9 is another write precompensation circuit according to the present invention.

FIG. 9 is yet another embodiment of a write precompensation circuit according to the present invention. The write precompensation circuit is similar to the circuit of FIG. 8 with the further addition of several alternative modes of write precompensation operation. In FIG. 9, four D Flip-Flops 705, 700, 910 and 915 are provided. Flip-Flop 705 provides uncompensated data clocked by the reference delay while the remaining three Flip-Flops provide data clocked by three separate programmable delays. The multiplexer 905 receives the two bit PRECOMP signal 406 which indicates the selection of data clocked by the reference clock line 806 (PRECOMP=00), Delay 1 clock line 707 (PRECOMP=01), Delay 2 clock line 908 (PRECOMP=10) or Delay 3 clock line 909 (PRECOMP=11). The reference delay circuit 805 and the three programmable delay circuits 715, 920, and 925 each receive as inputs the clock signal 410. As in FIG. 8, the reference delay circuit 805 provides a reference delay at which uncompensated data may be clocked. Delay registers 720, 930 and 935 allow user programmable delay values to be provided to the programmable delay circuits. As described above, the net write precompensation delay between the reference delay and one of the programmable delay circuits may be set to zero by providing all "0"s to the associated delay register.

Thus, the write precompensation circuit 900 provides multiple user selectable data delays. For example, three separate data delays with respect to a reference clock may be obtained. Further, the various data signals are then multiplexed thus allowing selection of no write precompensation or three varying amounts of write precompensation. In this manner, the clock signals themselves need not be multiplexed.

The write precompensation circuit of FIG. 9 allows at least two modes of operation (bilevel and quadlevel) depending upon the magnetic write model utilized. For example, a bilevel mode may be utilized when the magnetic write model includes only non-linear bit shift. The quadlevel mode may be utilized when the magnetic write model includes partial erasure and/or non-linear head-field transition time. The operation of each of these modes may be seen in Tables 1–3. Ultimately the mode of operation and the pattern of the data to be written will determine the value of the PRECOMP signal 406 that is provided as a selection signal for the multiplexer 905. In particular, Tables 1–2 provide a two bit value for a WPC_MAP signal for bilevel and quadlevel modes respectively wherein $X_K$ is the write data at time K, $X_{K-1}$ is the write data at time K–1, etc.

TABLE 1

Bilevel Mode

| Label | $X_{k-1}$ | $X_k$ | WPC_MAP |
|---|---|---|---|
| isolated | 0 | 1 | 00 |
| adjacent | 1 | 1 | 01 |

TABLE 2

Quadlevel Mode

| Label | $X_{k-1}$ | $X_k$ | $X_{k+1}$ | WPC_MAP |
|---|---|---|---|---|
| isolated | 0 | 1 | 0 | 00 |
| begin | 0 | 1 | 1 | 01 |
| end | 1 | 1 | 0 | 10 |
| middle | 1 | 1 | 1 | 11 |

As shown in Tables 1 and 2 a Label is given to the possible data values. For example, as shown in Table 1 the Label "isolated" indicates that the data bit $X_K$ (a digital "1") does not have a digital "1" as a previous data bit (the $X_{K-1}$ data bit) and likewise "adjacent" indicates a digital "1" was present as the previous data bit. Likewise, the labels in Table 2 similar indicate the nature of the string of digital "1s" surrounding the $X_K$ bit.

The WPC_MAP value may then be mapped to a desired PRECOMP signal value by the use of the WPC_REF signal. The WPC_REF signal allows the user select which of the possible patterns of $X_K$, $X_{K-1}$, and $X_{K+1}$ will result in the most advanced clock edge with the remaining possible patterns delayed accordingly. For example, a bipolar mode user may desire that the least delay for a data pattern for $X_K$, $X_{K-1}$, and $X_{K+1}$ having data of 0 1 0 (the data labeled "isolated" in Table 2), and thus, as shown in Table 3 the WPC_REF is selected to be 0 0. For the least amount of delay to be set for data that matches the "begin" label in Table 2 (0 1 1 data), the user may set the WPC_REF to signal to 0 1. Table 3 illustrates the relationship of WPC_MAP to PRECOMP for the each WPC_REF value.

tion time (quadlevel mode) model may require zero relative delay for the transition in the middle of the "011" data pattern and greater than zero relative delays for the other patterns. This would be accomplished by setting WPC_REF to "01". The delay for the "010" pattern would be controlled by the Delay 1 clock (i.e. PRECOMP=01), the delay for the "011" pattern would be the reference delay clock (PRECOMP=00), the delay for the "110" pattern would be the Delay 2 clock (PRECOMP=10), and the delay for the "111" pattern would be the Delay 3 clock (PRECOMP=11).

Figure 10:
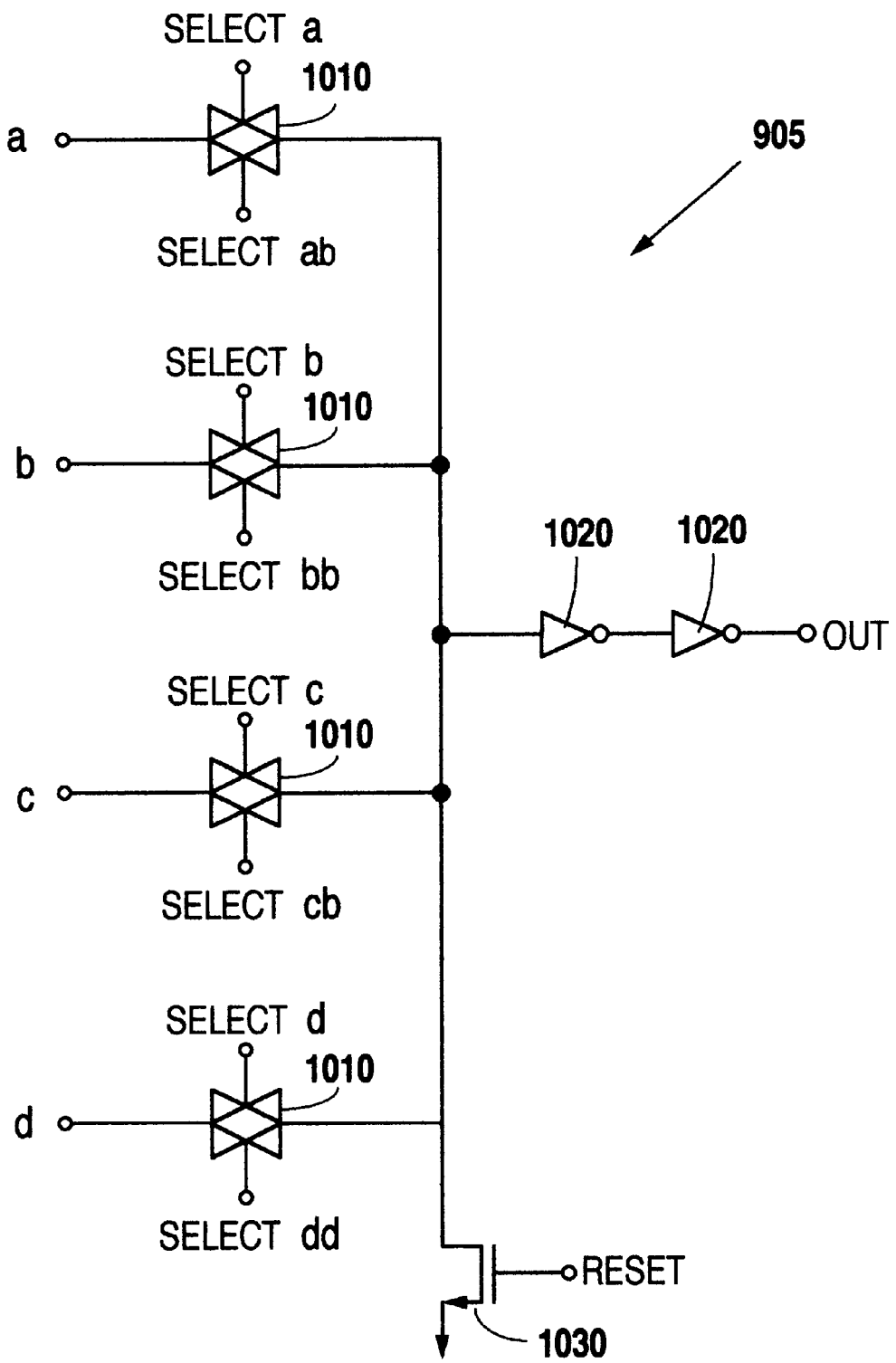
FIG. 10 is a circuit diagram of a multiplexer which may be used with the present invention.

The implementation of the present invention need not be limited to any specific circuit elements. Rather, one skilled in the art will recognize that the various circuit elements of the write precompensation circuit such as shown in FIG. 9 may be implemented in any of a wide variety of configurations, the selection of which may be a routine design choice. For example, a variety of delay circuits or multiplexer circuits may be utilized. One suitable multiplexer for use as multiplexer 905 of FIG. 9 is shown in FIG. 10. As shown in FIG. 10, four inputs (inputs a, b, c, and d which correspond to the inputs for the reference and three additional delay clocks) are provided to four switches 1010. Each switch 1010 may be a complimentary transistor pair having gate control signals such as select a, select b, select c, select d and their corresponding inverted signals (denoted select ab, select bb, etc.). The output of the switch that is selected may be provided to the multiplexer output through two inverters 1020. A reset transistor 1030 may be utilized to reset the multiplexer in response to a reset signal.

Figure 11:
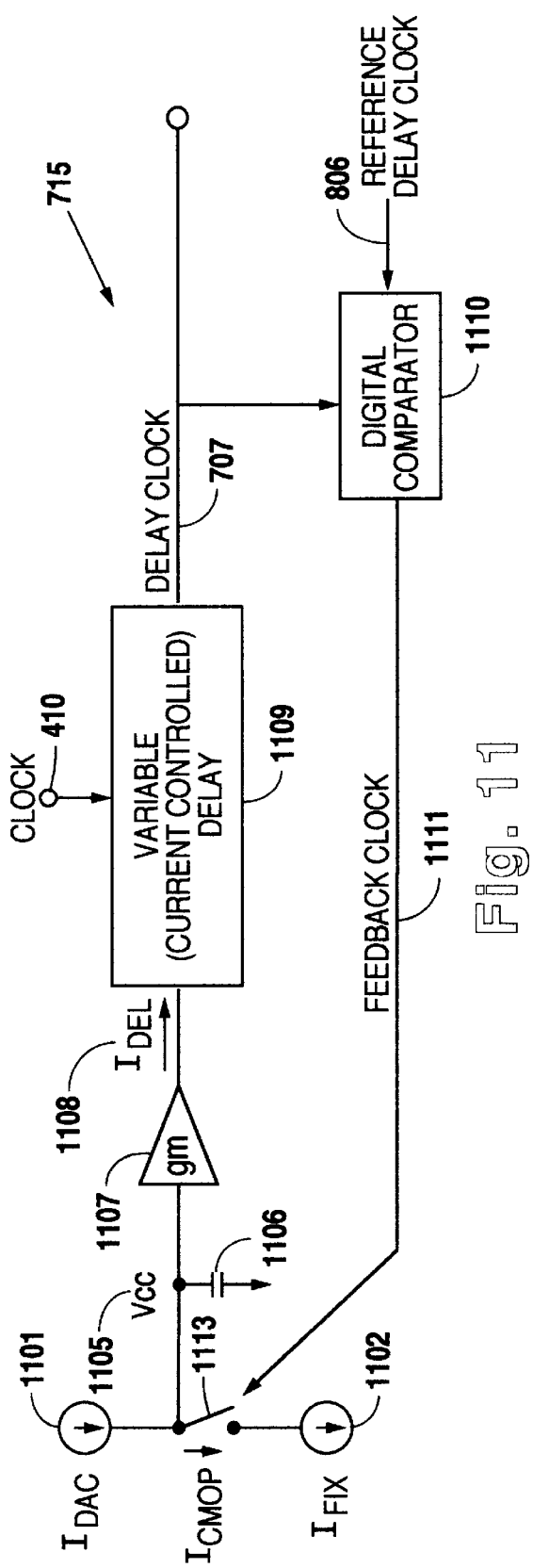
FIG. 11 is a schematic of a delay circuit which may be used with the present invention.

A variety of delay circuits may be utilized with the present invention. Though the invention is not limited to a particular delay circuit, one embodiment of a programmable delay cell is shown in FIG. 11. FIG. 11 is shown as an example delay circuit for use as programmable delay circuit 715 of FIGS. 7–9, though it will be recognized that such a delay circuit may be utilized for the other delay circuits utilized in the write precompensation system disclosed herein. As shown in FIG. 11, the delay circuit may include an $I_{DAC}$ current source 1101 and an $I_{FIX}$ current source 1102. A current switch 1113 may be located between the $I_{DAC}$ current source 1101 and the $I_{FIX}$ current source 1102. A voltage (Vc) node 1105 is connected to the current switch 1113, a capacitor 1106 and a transconductance cell 1107. The current output ($I_{DEL}$) of the transconductance cell 1107 is provided to a current controlled variable delay circuit 1109 which also receives the undelayed clock signal 410 from the frequency synthesizer and generates an output that is the delay clock signal 707 (also see FIGS. 7–9). Feedback is provided by coupling the delay clock signal 707 to a digital comparator 1110. The

TABLE 3

Precomp Mapping

| WPC_REF | WPC_MAP | PRECOMP | WPC_REF | WPC_MAP | PRECOMP |
|---|---|---|---|---|---|
|  | 00 | 00 |  | 00 | 10 |
| 00 | 01 | 01 |  | 01 | 01 |
|  | 10 | 10 | 10 | 10 | 00 |
|  | 11 | 11 |  | 11 | 11 |
|  | 00 | 01 |  | 00 | 11 |
| 01 | 01 | 00 |  | 01 | 01 |
|  | 10 | 10 | 11 | 10 | 10 |
|  | 11 | 11 |  | 11 | 00 |

The mapping of WPC_MAP to PRECOMP as shown in TABLE 3 allows any pattern to be mapped to the reference delay clock. For example, the non-linear head-field transidigital comparator 1110 also receives as an input the reference delay clock signal 806 (the output of the reference delay circuit 805 shown in FIG. 9 for example). The digital comparator 1110 provides an output that is the feedback clock signal 1111. The feedback clock signal 1111 in turns drives the current switch 1113, thus completing the feedback loop.

Figure 12:
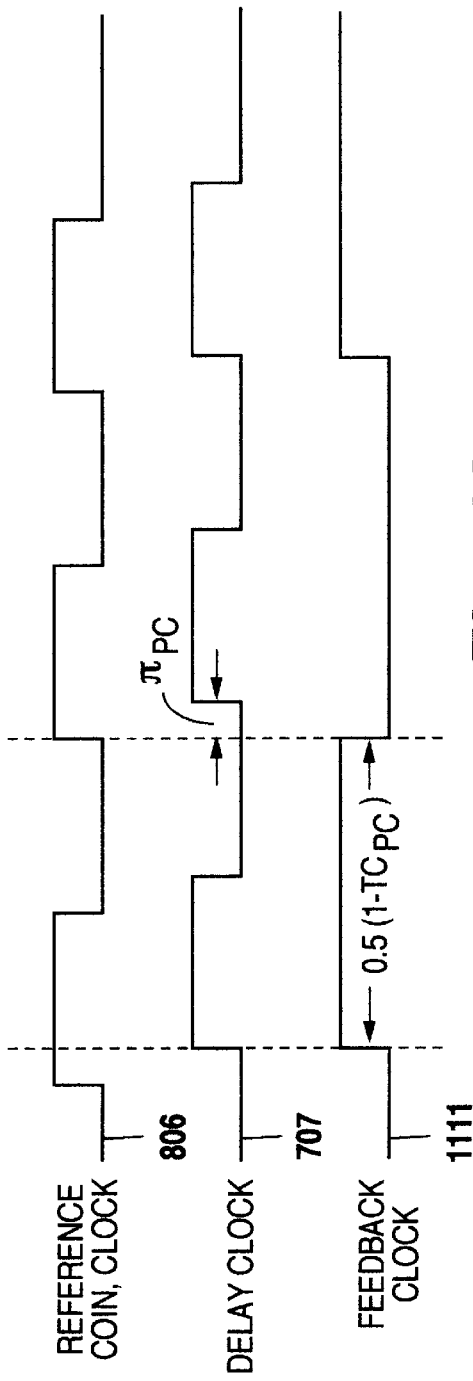
FIG. 12 is a timing diagram for signals referenced in the circuit of FIG. 11.

In the embodiment described above, the programmable delay circuit 715 includes a current controlled variable delay line that is driven by a feedback system which produces a DC current, $I_{DEL}$. In the feedback loop, the delayed clock signal 707 and the reference clock signal 806 are compared by the digital comparator 1110. The digital comparator 1110 produces the feedback clock signal 1111 with a duty cycle which is a function of the relative delay between the two clock inputs: duty cycle=$0.5(1-\pi_{PC})$, wherein $\pi_{PC}$ is the relative delay between the two input clocks such as shown in the timing diagram of FIG. 12.

The feedback clock 1111 drives the current switch 1113 which chops the DC current source ($I_{FIX}$) 1102 to produce an average output to be integrated on the capacitor 1106 of: $I_{CHOP}=I_{FIX}[0.5(1-\pi_{PC})]$. To oppose the $I_{CHOP}$ current and determine the $\pi_{PC}$ that the system operates at, a current source 1101 (for example a current digital to analog converter) is programmed to produce $I_{DAC}$. $I_{DAC}$ is programmed to equal $I_{CHOP}$ for the desired $\pi_{PC}$ through use of the user selectable value stored in the delay register 720. In the steady state, $I_{CHOP}=I_{DAC}$ and the delayed clock has a relative delay $\pi_{PC}$ vs. the reference clock. The steady state voltage on the integrating capacitor 1106 is converted to $I_{DEL}$ by the transconductance cell 1107. FIG. 13 illustrates one embodiment of a transconductance cell for use as cell 1107. As shown in FIG. 13, the transconductance cell may be comprised of transistor 1301 having a gate connected to the Vc voltage node 1301 and a resistor 1302 coupled between the transistor 1301 and ground with the $I_{DEL}$ current 1108 defined as shown. The $I_{DEL}$ current 1108 may be provided to a variable (current controlled) delay 1109 of which one illustrative embodiment is shown in FIG. 14. As shown in FIG. 14, the variable (current controlled) delay 1109 may include a ramp capacitor 1401, a voltage ramp node 1402, a switch 1404 and an inverter 1403. In operation, the voltage ramp node 1402 is reset to 0 volts by switch 1404 when the undelayed clock signal 410 from the frequency synthesizer is high. On the falling edge of the clock 410, the reset switch is released and the $I_{DEL}$ current charges the ramp capacitor 1401. When the voltage ramp node 1402 reaches the logic threshold ($V_{THR}$) of the inverter, the delayed clock signal 707 switches. The ideal time delay is: $t_1=[(C_{RAMP})(V_{THR})]/I_{DEL}$. FIG. 15 shows a timing diagram for the undelayed clock signal 410 from the frequency synthesizer, the voltage ramp node 1402, and the delayed clock signal 707. As can be noted from the timing diagram, the falling edge of the delayed clock 707 is delayed compared to the failing edge of the clock signal 410 while the rising edges are not delayed. The delayed edge of the delayed clock signal 707 may then be used to trigger the flip-flop 700 which is coupled to the clock signal 707 such as shown in FIG. 9.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Various changes may be made in the configuration, arrangement, and types of components or devices. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A write precompensation circuit, comprising:

a data input terminal;

a plurality of clock signals, at least one of said clock signals being delayed with respect to at least another of said clock signals, said clock signals being utilized to clock data at said data input terminal to generate a plurality of clocked data signals, at least one of said clocked data signals being delayed with respect to at least another of said clocked data signals;

a multiplexer coupled to said clocked data signals; and a data output terminal coupled to said multiplexer, said multiplexer providing at least one of said clocked data signals to said data output terminal.

2. The circuit of claim 1, further comprising:

a plurality of latch circuits coupled to said data input terminal and said plurality of clock signals, said latch circuits providing said plurality of clocked data signals to said multiplexer.

3. The circuit of claim 2, wherein said latches comprise flip-flops.

4. The circuit of claim 2, wherein said plurality of clock signals includes at least one undelayed clock signal and the remaining of said plurality of clock signals being generated from said undelayed clock signal.

5. The circuit of claim 1, said plurality of clock signals comprising at least one reference delay clock signal and at least one programmable delay clock signal.

6. The circuit of claim 1, further comprising:

an undelayed clock signal;

a plurality of delay circuits, said delay circuits comprising at least one reference delay circuit and at least one programmable delay circuit, said undelayed clock signal being coupled to said plurality of delay circuits, each of said delay circuits generating at least one of said plurality of clock signals; and a plurality of latch circuits, each of said latch circuits coupled to at least one of said clock signals, said latch circuits also being coupled to said data, said latch circuits being clocked by said plurality of clock signals.

7. A method of processing data in a write precompensation circuit, comprising:

providing an input data stream;

clocking said data stream by a plurality of clock signals to generate a plurality of clocked data streams, at least one of said clocked data streams being delayed with respect to at least another of said clocked data streams; and selecting at least one of said clocked data streams to provide output data.

8. The method of claim 7, further comprising:

providing said input data stream to a plurality of latches, said latches clocked by said plurality of clock signals.

9. The method of claim 8 wherein said plurality of clock signals comprises at least one reference delay clock signal and at least one programmable delay clock signal.

10. The method of claim 7 wherein said selecting step comprises multiplexing said plurality of clocked data streams.

11. The method of claim 10, at least one of said plurality of clock signals being programmable.

12. The method of claim 7, wherein said plurality of clock signals includes at least one undelayed clock signal, said method further comprising:

providing said input data stream to a plurality of latch circuits;

generating a plurality of precompensation clock signals from said undelayed clock signal, said plurality of precompensation clock signals comprising at least one reference delay precompensation clock signal and at least one programmable delay clock signal;

clocking each of said plurality of latches by separate ones of said plurality of precompensation clock signals; and multiplexing outputs of said latches to provide said output data.

13. A system for storing data, said system comprising:

a data storage device;

a system data input terminal for receiving data to be written to said data storage device; and a write channel circuit coupled to said system data input terminal and said data storage device, said write channel circuit including a data compensation circuit, said data compensation circuit comprising,
- a plurality of clock signals, at least one of said clock signals being delayed with respect to at least another of said clock signals, said clock signals being utilized to clock said data to generate a plurality of clocked data signals, at least one of said clocked data signals being delayed with respect to at least another of said clocked data input signals, and
- a multiplexer coupled to said clocked data signals, said multiplexer providing at least one of said clocked data signals at an output of said multiplexer.

14. The system of claim 13, said write channel circuit further comprising a plurality of latches, each of said latches coupled to said data and one of said plurality of clock signals.

15. The system of claim 14, at least one of said plurality of clock signals having a programmable delay.

16. The system of claim 13, further comprising:

an undelayed clock signal;

a plurality of delay circuits, said delay circuits comprising at least one reference delay circuit and at least one programmable delay circuit, said undelayed clock signal being coupled to said plurality of delay circuits, each of said delay circuits generating at least one of said plurality of clock signals; and a plurality of latch circuits, each of said latch circuits coupled to at least one of said clock signals, said latch circuits also being coupled to said data, said latch circuits being clocked by said plurality of clock signals.

17. A method of operating a system for writing data to a data storage device, said method comprising:

providing a data storage device;

providing an input data stream to be written to said data storage device; and processing said input data stream to provide write precompensation, said processing comprising,
- clocking said input data stream by a plurality of clock signals to generate a plurality of clocked data streams, at least one of said clocked data streams being delayed with respect to at least another of said clocked data streams, and
- selecting at least one of said clocked data streams to provide output data.

18. The method of claim 17, said selecting step comprising multiplexing said clocked data streams.

19. The method of claim 18, said clocking step comprising providing said input data stream to a plurality of latches and clocking each of said latches by one of said plurality of clock signals.

20. The method of claim 17, further comprising:

providing at least one undelayed clock signal;

providing said input data stream to a plurality of latch circuits;

generating a plurality of precompensation clock signals from said undelayed clock signal, said plurality of precompensation clock signals comprising at least one reference delay precompensation clock signal and at least one programmable delay clock signal;

clocking each of said plurality of latches by separate ones of said plurality of precompensation clock signals; and multiplexing outputs of said latches to provide said output data.

* * * * *